(12) United States Patent
Liebinger Portela et al.

(10) Patent No.: US 11,128,993 B2
(45) Date of Patent: Sep. 21, 2021

(54) MITIGATION OF ELECTROMAGNETIC INTERFERENCE IN ELECTRONIC COMMUNICATION

(71) Applicant: International Business Machines Corporation, Armonk, NY (US)

(72) Inventors: Franz Friedrich Liebinger Portela, San Pablo de Heredia (CR); Pablo Francisco Barquero Garro, Heredia (CR); Ricardo Golcher Ugalde, Llanos del Sol (CR); Meller Javier Perez Nunez, Heredia (CR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/451,071

(22) Filed: Jun. 25, 2019

(65) Prior Publication Data
US 2020/0413231 A1   Dec. 31, 2020

(51) Int. Cl.
*H04W 4/12* (2009.01)
*H04W 24/10* (2009.01)
*H04L 5/00* (2006.01)
*H04W 72/04* (2009.01)
*H04B 17/336* (2015.01)

(52) U.S. Cl.
CPC ............ *H04W 4/12* (2013.01); *H04B 17/336* (2015.01); *H04L 5/0044* (2013.01); *H04W 24/10* (2013.01); *H04W 72/0453* (2013.01)

(58) Field of Classification Search
CPC ... H04W 4/12; H04W 24/10; H04W 72/0453; H04L 5/0044; H04B 17/336
See application file for complete search history.

(56) References Cited

U.S. PATENT DOCUMENTS

| 6,222,876 | B1* | 4/2001 | Hirth ................. H04L 25/03885 |
| | | | 375/224 |
| 6,421,528 | B1 | 7/2002 | Rosen et al. |
| 7,369,879 | B1 | 5/2008 | Steigerwald et al. |
| 7,990,933 | B2 | 8/2011 | Horvat et al. |
| 9,118,469 | B2 | 8/2015 | Malkin et al. |
| 2006/0098731 | A1* | 5/2006 | Bae ......................... H03M 5/04 |
| | | | 375/240.1 |

(Continued)

FOREIGN PATENT DOCUMENTS

WO        03048799 A2    6/2003

OTHER PUBLICATIONS

Unknown, "Electrical Noise and EMI in the Workplace," Library. AutomationDirect.com, Printed Sep. 28, 2018, 5 pages, https://library.automationdirect.com/electrical-noise-and-emi-in-the-workplace/.

(Continued)

*Primary Examiner* — Jeffrey M Rutkowski
*Assistant Examiner* — Chae S Lee
(74) *Attorney, Agent, or Firm* — Peter J. Edwards

(57) ABSTRACT

A method of transmitting an electronic message may include identifying a first bit in a data message to be transmitted. The first bit may have a binary value. The method may also include transmitting, in response to the identifying, a first signal corresponding to the binary value over a second message channel. The method may also include transmitting, in response to the identifying, a second signal corresponding to the inverse of the binary value.

20 Claims, 5 Drawing Sheets

(56) References Cited

U.S. PATENT DOCUMENTS

| | | | |
|---|---|---|---|
| 2007/0230620 A1* | 10/2007 | Poberezhskiy | H04L 27/2071 375/308 |
| 2010/0008497 A1* | 1/2010 | Takatsu | H04L 9/002 380/42 |
| 2010/0322364 A1 | 12/2010 | Bogdan | |
| 2012/0185069 A1* | 7/2012 | Wu | G10L 19/018 700/94 |
| 2014/0286462 A1 | 9/2014 | Wu et al. | |
| 2018/0337865 A1* | 11/2018 | Siddaiah | H04L 43/0852 |

OTHER PUBLICATIONS

Shannon, "Communication in the Presence of Noise," Proceedings of the IRE, vol. 37, Issue 1, Jan. 1949, pp. 10-21, DOI: 10.1109/JRPROC.1949.232969, https://ieeexplore.ieee.org/abstract/document/1697831/.

* cited by examiner

MITIGATION OF ELECTROMAGNETIC INTERFERENCE IN ELECTRONIC COMMUNICATION

BACKGROUND

Aspects of the present disclosure relate to electronic-message transmission, more particular aspects relate to resiliency of electronic messages to electromagnetic interference.

Electromagnetic communication typically involves transmitting messages over message channels in the electromagnetic spectrum. These messages may be carried by electromagnetic signals that travel from a message transmitter to a message recipient. During this travel, the signals may be susceptible to sources of electromagnetic interference that may shift the values of the signals received. This may make electronic messages difficult to interpret, requiring increased time to analyze. In some instances, it may be necessary request retransmission of a message, which may be costly and time consuming.

SUMMARY

Some embodiments of the present disclosure can also be illustrated as a method for transmitting an electronic message. The method may comprise identifying a first bit in a data message to be transmitted. The first bit may have a binary value. The method may also comprise transmitting, in response to the identifying and over a first message channel, a first signal corresponding to the binary value. The method may also comprise transmitting, in response to the identifying and over a second message channel, a second signal corresponding to the inverse of the binary value. This method may enable a message recipient to accurately interpret the electronic message in the presence of some electromagnetic interference.

In some embodiments of the method, the first message channel may be a first frequency band and the second channel may be a second frequency band. These embodiments may facilitate identification of the first message channel and the second message channel by a message recipient.

Some embodiments the present disclosure can also be illustrated as a computer program product having program instructions embodied therewith, the program instructions executable by a computer to cause the computer to transmit an electronic message by the method described above.

Some embodiments of the present disclosure can also be illustrated as a method for analyzing an electronic message. The method may comprise receiving a first signal with a first value over a first message channel. The method may also comprise receiving a second signal with a second value over a second method channel. The method may also comprise subtracting the first value from the second value, resulting in a third value. The method may also include determining that the third value is greater than zero. The method may also include identifying a fourth value of a bit of a data message corresponding to the first signal. This method may enable a message recipient to accurately interpret the electronic message in the presence of some electromagnetic interference.

Some embodiments of the method may include calculating an interference variance between the first value and the second value. In these embodiments, a message recipient may be able to determine whether electromagnetic interference has affected the first signal and the second signal to degrees that are sufficiently different for analysis of the first and second signal to be unreliable.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
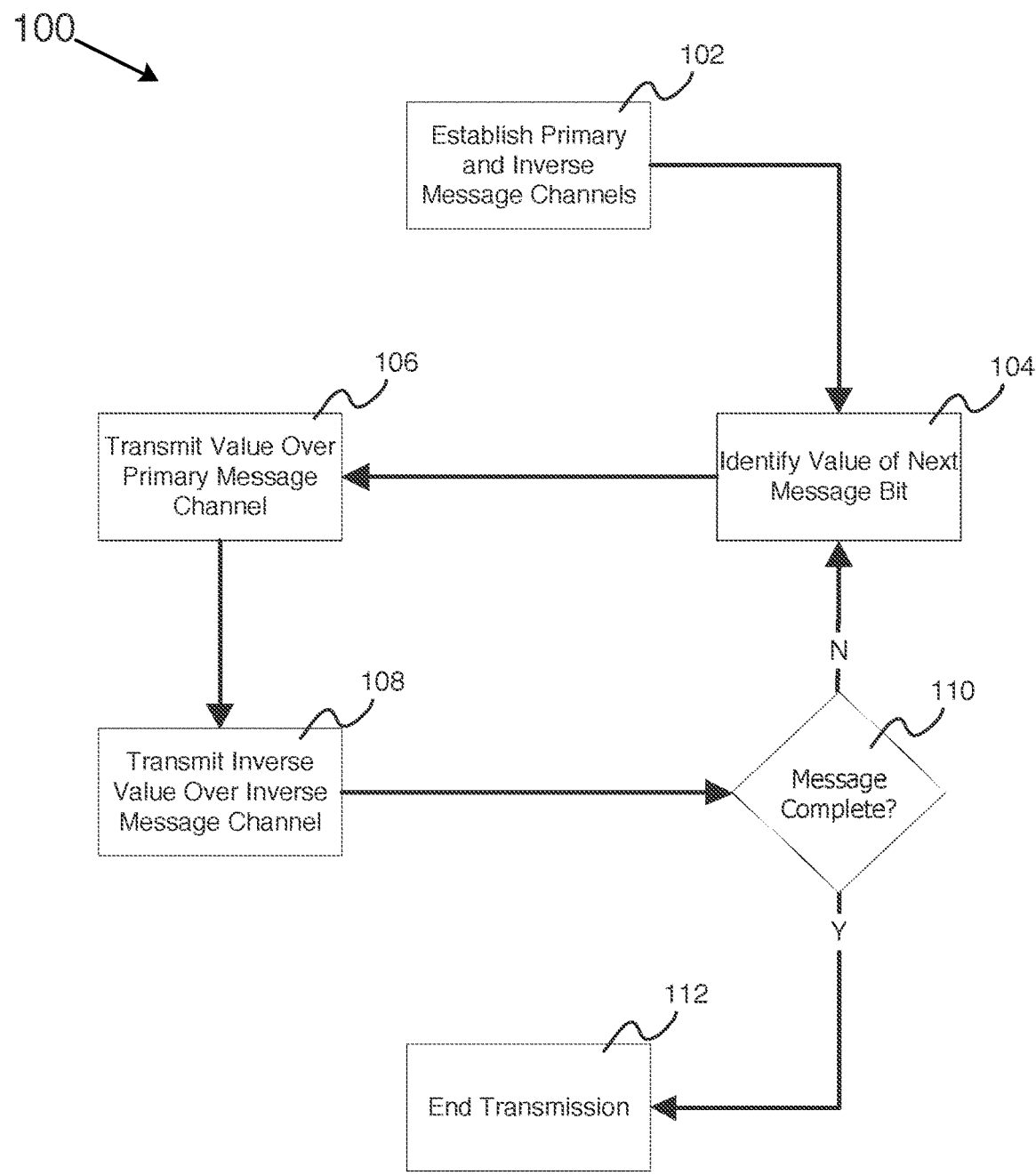
FIG. 1 depicts a method of transmitting inverse replica message signals over primary and inverse message channels, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to electronic-message transmission, more particular aspects relate to resiliency of electronic messages to electromagnetic interference. While the present disclosure is not necessarily limited to such applications, various aspects of the disclosure may be appreciated through a discussion of various examples using this context.

Communications over large and small distances, such as electronic messages or other electronic signals, may be transmitted from one location to another using patterns in the electromagnetic spectrum. For example, electromagnetic signals may be sent from a message transmitter to a message recipient by propagating an electromagnetic signal of a specific frequency oscillation (e.g., 850 Hz), or a range of frequency oscillations (e.g., between 849.5 Hz and 850.5 Hz) and informing the message recipient to "listen" for the signal at that frequency oscillation or that range of frequency oscillations (these ranges referred to herein as a "band of frequencies," a "frequency band" or a "frequency channel").

The message may be encoded in changes of properties of the electromagnetic signal, such as changes in the signal amplitude (e.g., voltage of the signal). Depending upon the use case, these signals could be sent to a message recipient through a physical connection (e.g., a coaxial cable, a fiber-optic cable, a power line) or a wireless connection (e.g., radio waves, microwaves, or wireless local area network communications).

In some use cases, patterns in electromagnetic signals (e.g., changes in the voltage of a signal) may encode a binary message. For example, a signal of a first voltage may encode a one (1), and a signal of a second voltage may encode a zero (0). Thus, by transmitting an electromagnetic pattern that changes between the first voltage and the second voltage, a message transmitter may effectively send a sequence of 1s and 0s that may then be converted into meaningful data.

For example, by alternating between two pre-established voltages, an electromechanical signal may encode the letter "A." In binary, "A" would typically be expressed by the sequence "01000001." In this example, a signal of five volts (5V) may signify a binary one (1), and signal of zero volts (0V) may signify a binary zero (0). By transmitting a string of signals over an agreed-upon channel of the sequence 0V, 5V, 0V, 0V, 0V, 0V, 5V, 0V, a message transmitter may effectively send the binary sequence "01000001," which may then be translated as the letter "A." This process may then be continued for the letters "r," "o," "b," "o," and "t" to transmit the message "A robot."

However, messages sent over electromagnetic signals are, in some environments and use cases, subject to electromagnetic interference. Electromagnetic interference may affect an electromagnetic signal during transmission in various ways, including changing the pattern properties of the signal in a way that makes discerning the message-encoding pattern difficult. For example, local weather phenomena (e.g., lightning), electromagnetic phenomena (e.g., solar activity), and electromagnetic noise from nearby electronics (e.g., power lines) may all affect the voltage or polarity of an electromagnetic signal, causing the signal that is received by a recipient to differ from the signal that was originally transmitted. Further, different sources of electromagnetic interference may affect different frequency ranges to different extents. For example, a source of electromagnetic interference may have a negligible effect on communication signals transmitted over a channel at 115 MHz, but a very significant effect on communication signals transmitted over a channel at 4.3 GHz. Typically, communications channels with similar frequencies will be affected in a similar way by a source of electromagnetic interference.

Continuing the previous example of transmitting the letter "A" through a sequence of 0V and 5V signals, electromagnetic interference during sequence of voltages may change the recipient's ability to confidently translate the message. For example, interference during the fourth and fifth voltage signals may increase the received voltage from 0V to 2.5V. The message recipient may be unable to determine whether those signals were intended to signify a binary 0 (0V) or a binary 1 (5V). This uncertainty would then translate to an inability to determine whether the binary message was intended to transmit the letter "A" (01000001) or the letter "Y" (01011001).

In some instances, the inability to translate portions of a message due to electromagnetic interference may be addressed by considering the affected portion of the message with the remainder of the message. Continuing, again, the previous example, if the message recipient considered the affected signal with the remainder of the message, it may conclude that the first portion of the was intended to transmit the letter "A," because "A robot" makes more sense than "Y robot." In this way, a message recipient may, in some instances, compensate for uncertainties due to slight interference by analyzing the message as a whole.

However, in some instances electromagnetic interference may be of sufficient magnitude or duration that this adaptation is not feasible. In the previous example the voltages of only two signals (two "bits") of the first letter of the message were affected. However, in some instances multiple voltages of each letter of the message may be affected. Further, in some instances each voltage signal of each letter of the message may be affected in a different direction or different magnitude (e.g, one 5V transmission may be received as 3.1V, whereas a subsequent 5V transmission may be received as 6.1V). As the number of individual signals that are affected increases and as the differences in the way in which those signals are affected increase, the ability of the message recipient to compensate for the interference may decrease drastically.

Thus, in some instances the message recipient may request that a message be retransmitted rather than attempt to analyze the message to determine the most likely translation of the message. In some instances, a retransmitted message may allow a recipient to analyze a message and translate the entire message. However, the process of requesting retransmission and waiting for the message to be retransmitted may cause delays that, in some use cases, are undesirable.

Furthermore, electromagnetic interference may, in some instances, be of sufficiently high duration that a retransmitted message may be affected by the same electromagnetic interference that caused the retransmission to be necessary. Thus, when some messages are retransmitted because electromagnetic interference made the original messages undecipherable, the retransmitted messages may also be undecipherable. In these instances, in addition to experiencing delays associated with retransmission requests, message recipients may be unable to efficiently analyze received messages until the source of electromagnetic interference ceases. This may be of particular concern in areas with frequent sources of electromagnetic interference (e.g., near high-voltage power lines).

Embodiments of the present disclosure enable efficient analysis of electromagnetic messages in the presence of some electromagnetic interference. Therefore, the embodiments of the present disclosure can be used to avoid, in some instances of electromagnetic interference, more significant, inefficient message analysis, the need to request message retransmission, and the inability to decipher messages until the electromagnetic interference ceases.

In some embodiments of the present disclosure, a message transmitter may transmit two inverse replicas of a message over two message channels. For example, when transmitting a message containing the letter "A," the transmitter may transmit "01000001" on a first frequency band and "10111110" on a second frequency band. In some embodiments, these two message channels may share the same frequency (or frequency band), but differ in the polarization of the electromagnetic signals travelling over those channels. For example, a first message channel may transmit messages over a frequency using horizontally polarized signals, whereas a second message channel may transmit inverse replica messages over the frequency using vertically polarized signals.

In some embodiments, a message recipient may receive inverse replicas of a message and analyze them together to identify the intended meaning of the message, even in the presence of electromagnetic interference that may otherwise make the message undecipherable.

In some embodiments, a message sender and message recipient may participate in a handshake process before the transmission of a message. In this handshake process, the sender and recipient may agree upon the conditions under which the message is to be sent. For example, the sender and recipient may agree upon the message channel that will transmit the primary message signals. This channel may be referred to as the "primary channel." When transmitting the letter "A" in binary, for example, a primary channel would transmit "01000001." The sender and recipient may also agree upon the message channel that will carry the inverse message signals (i.e., the signals that are the inverse of the primary signals). When transmitting the letter "A" in binary, for example, an inverse channel would transmit "10111110," the inverse of the signals carried by the primary channel.

In some of these and other embodiments, a message recipient may compare the signal values received over primary channel with the signal values received over the inverse channel. This may be useful, for example, in instances in which electromagnetic interference makes it difficult for a recipient to determine whether the primary channel is intending to communicate a 0 or a 1. To continue a previous example, in some instances a 0 may be communicated by transmitting a signal of 0 volts and a 1 may be communicated by transmitting a signal of 5 volts. However, if a recipient receives signal of 2.5 volts, the recipient may struggle to determine whether the transmitter (a) intended to transmit 0 volts, but interference shifted the received value from 0V to 2.5V, or (b) the transmitter intended to transmit 5 volts, but interference shifted the received value from 2.5V to 0V.

In this example, the recipient may compare this questionable primary-channel value to the inverse-channel value. If, hypothetically, the recipient receives a 7.4-volt signal on the inverse channel, the recipient may determine that the recipient received a signal on the inverse channel that is approximately 5V above the value received by the primary channel. Thus, the recipient may be able to confidently conclude that the transmitter transmitted a "low" value (here, a binary 0) over primary channel. In this way, the recipient may be able to quickly analyze the messages signals to determine the intended data of the message, even when electromagnetic interference is of sufficient magnitude or duration to make other forms of signal analysis impractical. In these instances, the embodiments of the present disclosure may enable a message to be deciphered when a request to retransmit the message would otherwise be required.

Stated another way, if a recipient receives a signal over the primary channel that is has an amplitude of 2.5V, the recipient may compare the signal to a replica received over the inverse channel. If the signal received over the inverse channel has an amplitude of −2.5V (in embodiments in which negative, "less than ground" voltage is possible), the recipient may conclude that the original signals were sent over the primary channel at 5V and the inverse channel at 0V, but that electromagnetic interference shifted the polarization of each signal by negative 2.5V. However, if the signal received over the inverse channel is polarized at 7.5V, the recipient may conclude that the original signals were sent over the primary channel at 0V and the inverse channel at 5V, but that electromagnetic interference shifted the amplitude of each signal by 2.5V.

As discussed previously, signals transmitted on message channels with similar frequencies may be affected more similarly than signals transmitted on message channels with significantly different frequencies. Thus, in some embodiments of the present disclosure, it may be beneficial to select primary and inverse message channels that contain similar frequency bands. For example, a transmitter and recipient may select a primary channel with a frequency range of 108.00 MHz to 108.01 MHz for aeronautical radionavigation communications. In this example, it may be more beneficial to select an inverse channel with a frequency range of 108.01 MHz to 108.02 MHz rather than an inverse channel with a frequency range of 117.01 MHz to 117.02 MHz. Because the effect of electromagnetic interference on an inverse channel with a frequency range of 108.01 MHz to 108.02 MHz is likely to be similar to the effect on the primary channel, it may be relatively uncomplicated to analyze the primary and inverse replica messages because the values of each would be similarly affected by electromagnetic interference.

In some embodiments of the present disclosure, therefore, transmitters and recipients of a message may select primary and inverse channels in a handshake process before a message is sent. In some embodiments, primary and inverse channels may be selected in a way that minimizes the unequal effect of interference on signals sent over the two channels. This inequality between the effect of interference on signals of the primary channel and the inverse channel may be referred to as "variance" or "interference variance." In some embodiments, this variance may be calculated by a message recipient by calculating the difference between the values received on the primary and inverse channels and comparing that difference to the difference that would be expected in the presence of zero interference.

For example, in some embodiments a message may be sent in which a 12V signal signifies a binary "1" and a 0V signal signifies a binary "0." In the presence of zero electromagnetic interference, the two values received over a primary channel and an inverse channel would differ, in theory, by 12V. However, because the presence of electromagnetic interference may have unequal effects on each signal (i.e., interference variance), the two values received may differ in practice by, for example, 11V. A message recipient may calculate the interference variance by finding the absolute value of the expected difference between signals (e.g., 12V) and the actual difference between signals (e.g., 11V). In this example, the interference variance may be 1V.

In some use cases, it may be desired to achieve an interference variance below a threshold value. This may be beneficial, for example, to increase the confidence that analysis of the differences between primary and inverse signals is a reliable indicator of the intended binary value of the primary channel. In some embodiments, for example, primary and inverse channels may be selected in an effort to achieve a variance threshold of twenty percent. A variance threshold of twenty percent may be achieved if the interference variance between a primary and inverse signal is equal to or less than 20% of the expected difference between those two signals.

For example, in a use case in which a 12V signal signified a binary 1 and a 0V signal signified a binary 0, the expected difference would be 12V. In this example, an interference variance of 2.4 or less would pass a 20% variance threshold. Alternatively, in a use case in which 10V signified a binary 1 and 0V signified a binary 0, the expected difference would be 10V. In this example, an interference variance of 2 or less would pass a 20% variance threshold.

FIG. 1 illustrates a method 100 by which a message transmitter may mitigate potential electromagnetic interference by transmitting message signals over a primary message channel and an inverse message channel. In block 102, a message transmitter establishes primary and inverse message channels. In some embodiments, the message transmitter may do this unilaterally (i.e., without input from any other party, such as a message recipient). In these embodiments, the message transmitter may provide the frequency ranges of the primary and inverse channels before beginning to transmit a message. In other embodiments, the message transmitter may select the primary and inverse message channels with input from a message recipient, such as during a handshake procedure. In some embodiments, the primary and inverse message channels may be selected to reduce the interference variance between the signals of the primary channel and the inverse channel (i.e., to reduce the difference in the effects of a source of electromagnetic interference between the signal of the primary channel and the signal of the inverse channel). In some embodiments, the primary and inverse message channels may be the same channel. In these embodiments, primary message bits may be transmitted at a first established polarity, and inverse message bits may be transmitted at a second established polarity.

In block 104, the value of the next bit to be translated in a message is identified. For example, if the message transmitter is beginning to transmit the message, the message transmitter would identify the value of the first bit in the message in block 104. Alternatively, if the message transmitter has previously transmitted some data of the message, the message transmitter may identify the value of the next bit in the message that has not yet been transmitted. The value of the bit, in some embodiments, may be expressed as a binary value (e.g., a binary "1" or a binary "0"). In some embodiments, the message transmitter may only identify the value of the next message bit in block 104. In other embodiments, the message transmitter may also identify the value of the inverse message bit as part of block 104.

In block 106, the message transmitter transmits the value for the corresponding message bit over the primary message channel. In some embodiments, transmitting the value may take the form of sending a signal of a particular amplitude (e.g., voltage). In block 108, the message transmitter transmits the inverse value over the inverse message channel. For example, in use cases in which the message is encoded in a binary signal, the inverse value of a binary "1" would be a binary "0." In some embodiments, transmitting this inverse value may take the form of sending a signal that is recognized as the inverse of the signal transmitted in block 106. For example, a message transmitter and recipient may establish that a 6V signal encodes a binary "1" and a 1V signal encodes a binary "0." If a 1V signal were transmitted in block 106 to signify a binary "0," a 6V signal may be transmitted in block 108 to signify a binary "1."

In block 110, the message transmitter determines whether the complete message has been transmitted. If some content of the message remains (e.g., unsent bits), the message transmitter proceeds to block 104 to identify the value of the next message bit. If, however, the complete message has been transmitted, the message transmitter proceeds to block 112, and ends the transmission. In some embodiments, block 112 may include sending a signal or series of signals to the message recipient to inform the message recipient that the message is complete. In other embodiments, the block 112 may simply involve cessation of any further message transmission.

In some embodiments of the present disclosure, a message recipient may receive a message over a primary channel and an inverse message over an inverse channel. In these embodiments, the message recipient may analyze the values of the signals sent over the two channels to interpret the message data in the presence of electromagnetic interference. An example method of such analysis is presented by method 200 of FIG. 2.

Method 200 begins in block 202 in which a message recipient receives a primary and inverse message signal. In block 202, the primary message signal may be sent over a primary message channel (e.g., a first frequency band, a particular polarization in a frequency) and the inverse message signal may be sent over an inverse message channel (e.g., a second frequency band, a second polarization in the frequency). In some embodiments of method 200, these primary and inverse channels may have been previously agreed upon by the message recipient and a message transmitter.

In block 204, the message recipient identifies the value of the signal received over the primary channel. In some embodiments, this would involve identifying the voltage of the signal received over the primary channel. In block 206, the message recipient identifies the value of the signal received over the inverse channel. In some embodiments, this would involve identifying the voltage of the signal that was received over the inverse channel at the same time as the signal received over the primary channel was received.

Figure 2:
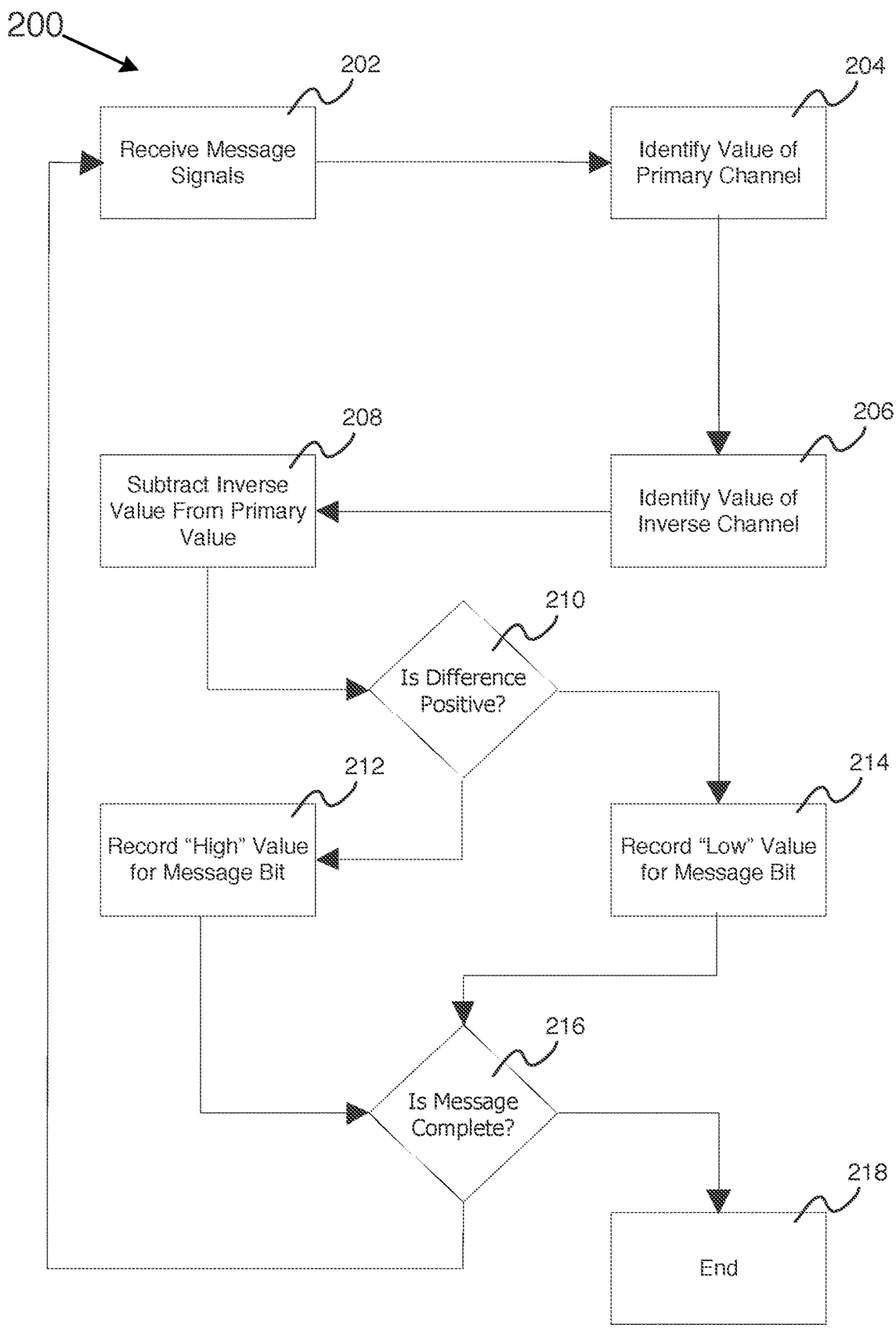
FIG. 2 depicts a method of analyzing received inverse replica message signals, in accordance with embodiments of the present disclosure.

In block 208, the value of the signal received over the primary channel is compared to the value received over the inverse channel. As illustrated in FIG. 2, this includes subtracting the value of the signal received over the inverse channel (e.g., the inverse value) from the value of the signal received over the primary channel (e.g., the primary value). In other embodiments, this may include subtracting the primary value from the inverse value.

In block 210, the message recipient determines whether the difference between the primary value and the inverse value is positive or negative. For example, if a 2V signal were received in block 204 and a 7V signal were received in block 206, subtracting the inverse value from the primary value signal would result in a −5V difference. If, on the other hand, a 13V signal were received in block 204 and a 1V signal were received in block 206, subtracting the inverse value from the primary value would result in a 12V difference.

In the embodiment illustrated in FIG. 2, a determination that the difference is positive would imply that the signal originally transmitted over the primary channel was higher than the signal originally transmitted over the inverse channel. In other words, a positive difference may imply that the primary channel transmitted a "high" value. Thus, if the message recipient determines in block 210 that the difference is positive, it records a "high" value in block 212. If, on the other hand, the message recipient determines in block 210 that the difference is negative, it records a "low" value in block 214.

In some embodiments, identifying whether a message bit is "high" or "low" may be translated into a binary "1" or "0," which can then be combined with the other bits in the message and read by a processor. For example, in some embodiments a "high" value (e.g., 12V) may encode a binary "1" and a "low" value (e.g., 0V) may encode a binary "0." In other embodiments, a "high" value (e.g., 5V) may encode a binary "0" and a "low" value may encode a binary "1."

After recording the message value for the received signals, the message recipient determines in block 216 whether the message is complete. In some embodiments, this may include identifying a "message complete" indication in the message. In other embodiments, this may include waiting a pre-determined period of time and determining whether any further message signals are received. If the message recipient determines that the message is not complete, the message proceeds to receive further message signals in block 202. If, on the other hand, the message recipient determines that the message is complete, the message recipient concludes method 200 in block 218.

As discussed previously, electromagnetic interference may impact signals of different frequencies to different degrees, resulting in interference variance. For example, a first signal transmitted over a very high frequency may be significantly impacted by a source of interference, while a second signal transmitted over a very low frequency may be only negligibly impacted by the same source of interference. For example, if the first signal and second signal were both 5V signals, a message recipient may receive the first signal as 13V, whereas the message recipient may receive the second signal as 5.01V. As discussed previously, the difference in the impact on the first and second signal may be referred to as "variance" or "interference variance." Interference variance may be expressed in a variety of forms, such as a percentage deviation between the difference between the values received on the primary and inverse channels and the difference that would be expected in the presence of zero interference (in other words, the difference of the transmitted values).

In some embodiments of the present disclosure, a high interference variance may make analyzing primary signals in light of inverse signals less accurate. For example, a primary signal may be transmitted at 4V and an inverse signal may be transmitted at 1V. If the inverse signal is significantly affected by a source of interference but the primary signal is less significantly affected, the primary signal may be received at 4.05V, whereas the inverse signal may be received at 3.95V. Analyzing the primary and inverse signal by a method resembling method 200, for example, a message recipient may correctly determine that the primary signal was a "high" value. However, if a second message signal were transmitted with the same values in the presence of slightly stronger interference, the primary signal may be received at 4.07V, but the inverse message signal may be received at 6.12V. Applying method 200 to these signals, a message recipient may then incorrectly determine that the primary signal has a "low" value. In some instances, this may cause the message to become jumbled, requiring further time and resources to further analyze the message values. In other instances, this may cause the message to become completely unreadable.

Thus, relying on primary and inverse message signals with a high variance may result in incorrect analysis results. For this reason, identifying instances in which interference variance is outside of a range of acceptable interference variances (e.g., a range of percentages) may be beneficial. In those identified instances, it may further be beneficial to request that the message signals be retransmitted with the expectation that the interference source may have reduced, causing the signals to be received with a lower variance.

Figure 3:
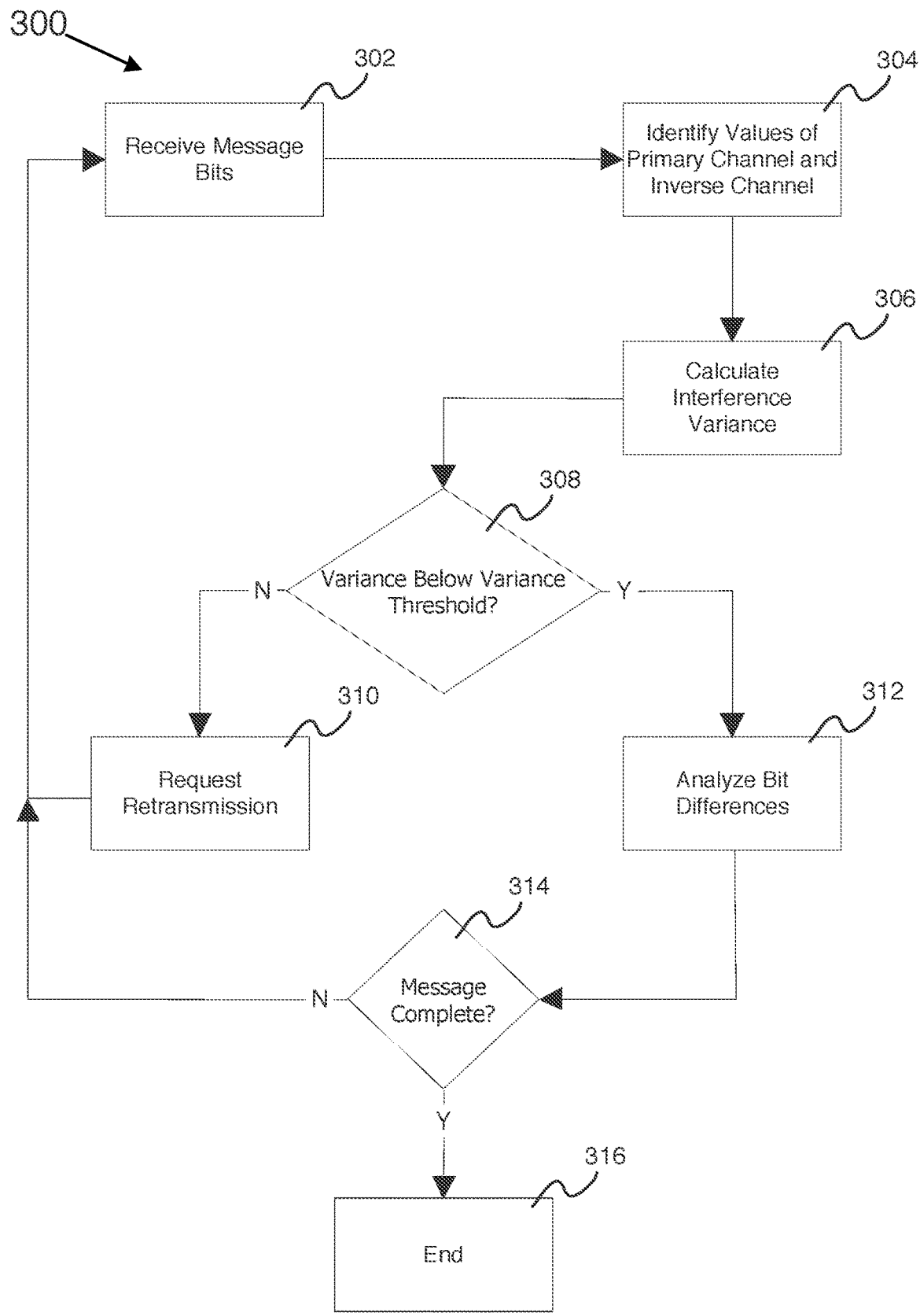
FIG. 3 depicts a method of determining whether interference variance between two message signals is bound by a variance threshold, in accordance with embodiments of the present disclosure.

Such an embodiment is illustrated in method 300 of FIG. 3. In block 302, a message recipient receives a signal over a primary channel (e.g., a primary signal) and a signal over an inverse channel (e.g., an inverse signal). In block 304, the message recipient identifies the value of the primary signal and identifies the value of the inverse signal. The message recipient then proceeds to calculate the interference variance for the received signals in block 306.

Identifying the interference variance for the received primary and inverse signals may involve calculating the deviation of the difference between the received primary and inverse signals from the ideal difference between the primary and inverse signals. The ideal difference may be expressed as the absolute value of the difference between the expected values of the signals in the presence of zero interference. Typically, this expected difference should be equal to the difference in the values at the time of transmission. Therefore, the expected difference could be determined in a handshake procedure with the message transmitter.

For example, before a message is transmitted, a message transmitter and message recipient may agree that the message is to be sent in binary encoding in which a signal of 6V represents a binary "1" and a signal of 1V represents a binary "0." In this example, a "high" primary signal (e.g., binary "1") would be transmitted with a value of 6V, and a corresponding inverse signal would be transmitted with a value of 1V. Further, a "low" primary signal (e.g., binary "0") would be transmitted with a value of 1V, and a corresponding inverse signal would be transmitted with a value of 6V. Thus, regardless of whether a primary signal were high or low, the absolute value of the expected difference between the primary signal would be 5V. Thus, in this example, the ideal difference between primary and inverse signals would be 5V.

Once the ideal difference is identified, the interference variance (the deviation from that ideal difference) may be calculated. In some embodiments, the interference variance may be expressed as a percentage by which the received difference deviates from the ideal difference.

Continuing the previous example, a primary signal may be received at 5V, whereas a corresponding inverse signal may be received at 0.5V, resulting in an actual received difference of 4.5V. Thus, the actual received difference deviates, in this example, from the ideal difference by 0.5V, resulting in a 0.5V variance. This variance may be expressed as a percentage by dividing the variance by the ideal difference and multiplying by 100% (i.e., (0.5V/5V)*100%)). In this example, this would result in an interference variance of 10%.

After the interference variance is calculated in block 306, the message recipient determines whether the interference variance is bound by a variance threshold. In method 300, this determination takes the form of determining in block 308 whether the interference variance is below a variance threshold. However, in other embodiments, the determination may take the form of determining whether the interference variance is above a variance threshold, below or equal to a variance threshold, or above or equal to a variance threshold.

For example, in some use cases an interference variance of over 20% may be unacceptably high. In these use cases, a variance threshold of 20% may be established. Thus, continuing the previous example, an interference variance of 10% would be below the variance threshold. However, if the variance for the received values had been 1.5V, the variance could be expressed as a 30% variance ((1.5V/5V)*100%). In this instance, the variance would be above the variance threshold, potentially leading to inaccurate analysis of the primary and inverse signals.

If the message recipient determines in block 308 that the variance is not below the variance threshold, the message recipient requests retransmission of the primary and inverse message signals in block 310, and receives the message bits in block 302. In some embodiments, a message recipient and message transmitter may select new primary and inverse message channels in the even that a repeated message exhibits variance above the threshold. For example, a message recipient may perform blocks 302 through 310 six times in a row for the same message bit, each time calculating variance above a variance threshold. In this example, after the sixth determination of block 308, the recipient may not request retransmission of the message bits in block 310, but may request new a primary channel, a new inverse channel, or both.

If, however, the message recipient determines in block 308 that the variance is below the variance threshold, the message recipient proceeds to analyze the bit differences in block 312. In some embodiments, this may resemble the process illustrated by method 200 (e.g., blocks 208 through 214). After the bit differences are analyzed in block 312, the message recipient determines if the entire message has been received in block 314. In some embodiments, this may resemble the process illustrated by block 216 in method 200. If the message recipient determines that the message is not complete, the message recipient proceeds to receive further message bits in block 302. If, however, the message recipient determines that the message is complete, the message recipient may end method 300 in block 316.

Figure 4A:
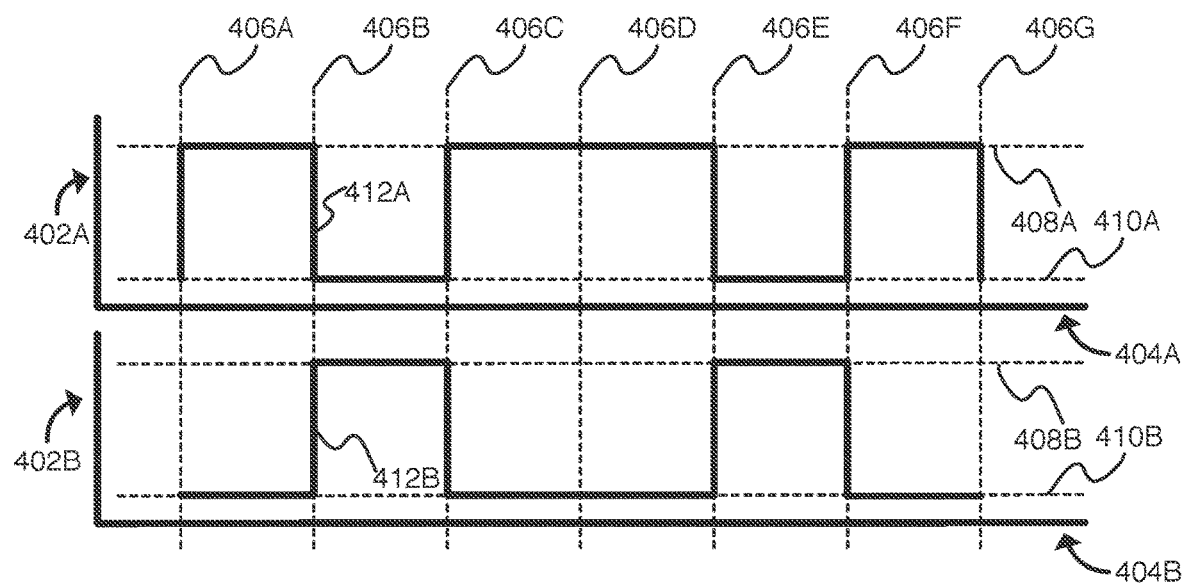
FIG. 4A depicts an illustration of a primary message signal transmitted over a primary message channel and an inverse message signal transmitted over an inverse message channel, in accordance with embodiments of the present disclosure.
Figure 4B:
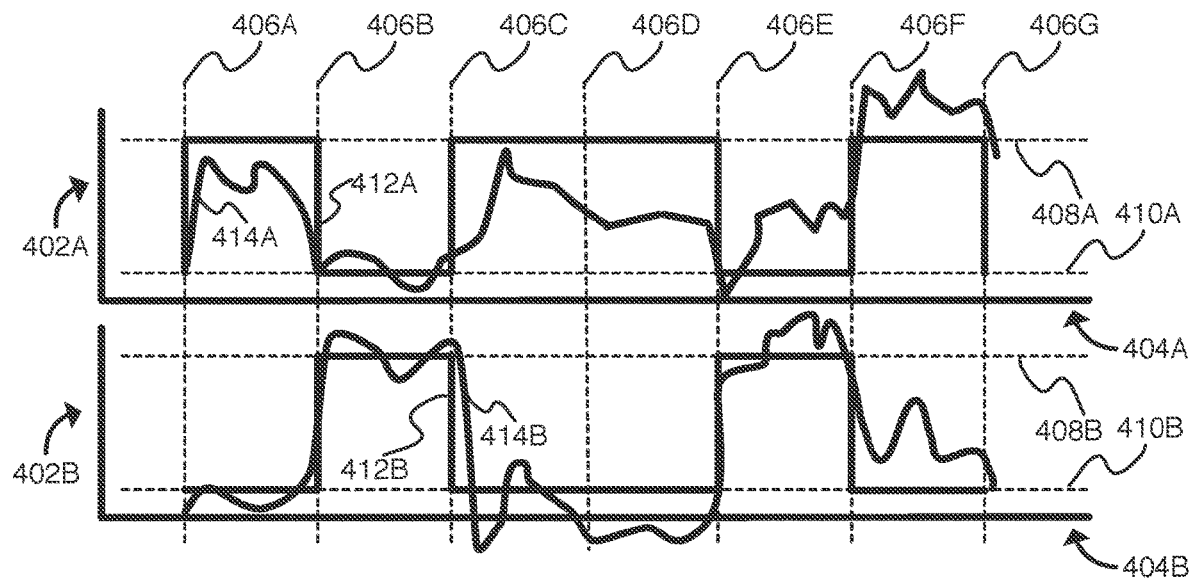
FIG. 4B depicts an illustration of a primary message signal received over a primary message channel and an inverse message signal received over an inverse message channel, in accordance with embodiments of the present disclosure.

For ease of illustration, FIG. 4A discloses a graphical representation of a transmission of six message bits over a primary channel and an inverse channel, and FIG. 4B discloses hypothetical received signals for the six message bits over the primary and inverse message channels.

In FIGS. 4A and 4B, axis 402A expresses the amplitude (e.g., voltage) of message signals sent over a primary channel. Axis 402B expresses the amplitude of corresponding inverse message signals sent over an inverse channel. Axis 404A, on the other hand, expresses the time during which the message is transmitted. Markers 406A-406G, then, are periodic intervals during which the message is transmitted. For example, if a message transmission were to begin at marker 406A, markers 406B may occur at 1 millisecond after the message transmission began, and marker 406C may occur at 2 milliseconds after the message transmission began.

In FIGS. 4A and 4B, markers 408A and 408B indicate the "high" value of a message. For example, this may be an amplitude value that is agreed upon in a handshake procedure to encode a binary "1," and may be equal to 5V. Markers 410A and 410B, on the other hand, indicate the "low" value of a message, and may be an amplitude value that is agreed upon in a handshake procedure to encode a binary "0." In some embodiments, Markers 410A and 410B may be equal to 0V.

In FIGS. 4A and 4B, line 412A expresses the transmitted amplitude values of message signals sent over a primary message channel between markers 406A through 406G, and line 412B expresses the transmitted amplitude values of corresponding message signals sent over an inverse message channel. For ease of illustration, the distance between markers 406A through 406G will be described as equal to the amount of time that the transmission of a single message signal (e.g., a message bit) is transmitted. Thus, line 412A may represent the transmitted value for a first message bit between 406A and 406B and a second message bit between 406B and 406C.

For example, if transmitted amplitude values at 408A and 408B encoded binary "1s," and transmitted amplitude values at 410A and 410B encoded binary "0s," line 412A would express 6 transmitted primary message signals that encoded the message 101101, and line 412B would express 6 corresponding transmitted inverse message signals that encoded the message 010010.

For further ease of illustration, lines 412A and 412B are presented as perfect square signals, meaning there is no transition time between a high and low signal. In some embodiments, however, there may be a "ramp up" period when a message transitions from a low signal to a high signal, and a "ramp down" period when a message transitions from a high signal to a low signal.

In FIG. 4B, line 414A expresses the received amplitude values of message signals received by a message recipient over a primary message channel between markers 406A through 406G. Similarly, line 414B expresses the received corresponding amplitude values of message signals received by a message recipient over an inverse message channel between markers 406A through 406G. Line 414A is presented alongside line 412A in FIG. 4B to illustrate the effect of electromagnetic interference on the signal amplitudes between the message transmission (line 412A) and message receipt (line 414A). A similar presentation is given for lines 414B and lines 412B.

In some embodiments, a message recipient may analyze the received amplitude values illustrated by line 414A. As shown, line 414A is fairly close to line 412A between markers 406A and 406C, suggesting that electromagnetic interference may be having a small effect on the values of the message signal. However, the amplitude values of line 414A are more significantly lower than those of line 412A, on average, between markers 406C and 406E. This suggests that electromagnetic interference is more significantly affecting the values of the message signal between these markers. Specifically, it suggests that electromagnetic interference is shifting the amplitude of the signal in a negative direction. This may result in increased difficulty or impossibility of the message recipient to determine whether the signal of line 414A is intended to encode a "high" value or a "low" value between markers 406C and 406E. Similarly, the amplitude values of line 414A are higher than those of line 412A between markers 406E and 406G. Again, this may result in increased difficulty or impossibility in determining whether the signal of line 414A is intended to encode a "high" value or a "low" value.

To mitigate the effects of electromagnetic interference, the message recipient may analyze 414A in light of 414B. For example, a message recipient may calculate the average amplitude value of line 414A between markers 406C and 406D and the average amplitude value of line 414B between markers 406C and 406D. The message recipient may then subtract the average amplitude value of line 414B from the average amplitude value of line 414A, resulting in a positive number. This positive difference may signify that the signals corresponding to line 414A between markers 406C and 406D may encode a "high" value. This process may be repeated for the values between markers 406D and 406E.

Between 406E and 406F, on the other hand, subtracting the average value of line 414B from line 414A would result in a negative number. This negative difference may signify that the signals corresponding to line 414A between markers 406E and 406F may encode a "low" value. This process may be repeated for the values between 406F and 406G, resulting in a "high" value.

It is of note that lines 414A and 414B are not illustrated as mirror duplicates of one another. This is to emphasize that, in the illustrated embodiment, a source of electromagnetic interference is not resulting in completely identical effects on the primary message signals and the inverse message signals. Rather, there is a non-zero interference variance between the six signals that are transmitted between markers 406A through 406G. In some embodiments, a message recipient may determine whether this interference variance is above a variance threshold, and may request retransmission of one or more of the 6 message signals if the variance is above a variance threshold.

Figure 5:
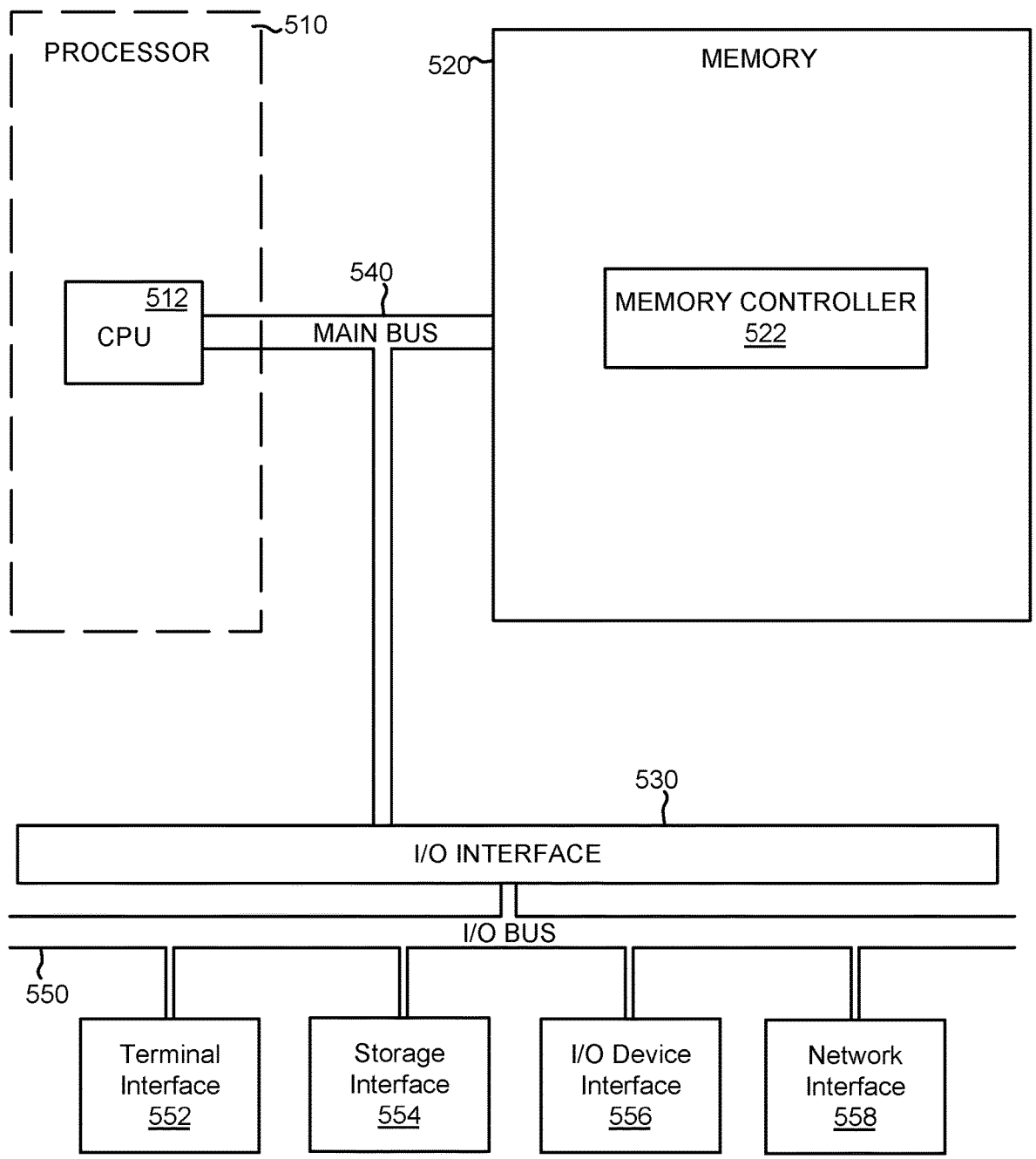
FIG. 5 depicts the representative major components of a computer system that may be used in accordance with embodiments.

FIG. 5 depicts the representative major components of an example Computer System 501 that may be used in accordance with embodiments of the present disclosure. The particular components depicted are presented for the purpose of example only and are not necessarily the only such variations. The Computer System 501 may include a Processor 510, Memory 520, an Input/Output Interface (also referred to herein as I/O or I/O Interface) 530, and a Main Bus 540. The Main Bus 540 may provide communication pathways for the other components of the Computer System 501. In some embodiments, the Main Bus 540 may connect to other components such as a specialized digital signal processor (not depicted).

The Processor 510 of the Computer System 501 may include one or more CPUs 512. The Processor 510 may additionally include one or more memory buffers or caches (not depicted) that provide temporary storage of instructions and data for the CPU 512. The CPU 512 may perform instructions on input provided from the caches or from the Memory 520 and output the result to caches or the Memory 520. The CPU 512 may include one or more circuits configured to perform one or methods consistent with embodiments of the present disclosure. In some embodiments, the Computer System 501 may contain multiple Processors 510 typical of a relatively large system. In other embodiments, however, the Computer System 501 may be a single processor with a singular CPU 512.

The Memory 520 of the Computer System 501 may include a Memory Controller 522 and one or more memory modules for temporarily or permanently storing data (not depicted). In some embodiments, the Memory 520 may include a random-access semiconductor memory, storage device, or storage medium (either volatile or non-volatile) for storing data and programs. The Memory Controller 522 may communicate with the Processor 510, facilitating storage and retrieval of information in the memory modules. The Memory Controller 522 may communicate with the I/O Interface 530, facilitating storage and retrieval of input or output in the memory modules. In some embodiments, the memory modules may be dual in-line memory modules.

The I/O Interface 530 may include an I/O Bus 550, a Terminal Interface 552, a Storage Interface 554, an I/O Device Interface 556, and a Network Interface 558. The I/O Interface 530 may connect the Main Bus 540 to the I/O Bus 550. The I/O Interface 530 may direct instructions and data from the Processor 510 and Memory 520 to the various interfaces of the I/O Bus 550. The I/O Interface 530 may also direct instructions and data from the various interfaces of the I/O Bus 550 to the Processor 510 and Memory 520. The various interfaces may include the Terminal Interface 552, the Storage Interface 554, the I/O Device Interface 556, and the Network Interface 558. In some embodiments, the various interfaces may include a subset of the aforementioned interfaces (e.g., an embedded computer system in an industrial application may not include the Terminal Interface 552 and the Storage Interface 554).

Logic modules throughout the Computer System 501—including but not limited to the Memory 520, the Processor 510, and the I/O Interface 530—may communicate failures and changes to one or more components to a hypervisor or operating system (not depicted). The hypervisor or the operating system may allocate the various resources available in the Computer System 501 and track the location of data in Memory 520 and of processes assigned to various CPUs 512. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    identifying a first bit in a data message to be transmitted, wherein the first bit has a binary value;
    transmitting, in response to the identifying and over a first message channel, a first signal corresponding to the binary value; and
    transmitting, in response to the identifying and over a second message channel, a second signal corresponding to the inverse of the binary value.

2. The method of claim 1, wherein the first message channel comprises a first frequency band, and the second message channel comprises a second frequency band.

3. The method of claim 1, wherein the first signal is transmitted over the first message channel in a first polarity and the second signal is transmitted over the second message channel in a second polarity.

4. The method of claim 1, further comprising informing a message recipient that the first message channel is a primary message channel and that the second message channel is an inverse message channel.

5. The method of claim 1, further comprising:
    receiving, from the message recipient, a request to resend the first and second messages, wherein the request comprises a notification that an interference variance between the first signal and the second signal is not bound by a variance threshold; and
    resending the first and second messages in response to receiving the request to resend the first and second messages.

6. The method of claim 5, further comprising:
    receiving, from the message recipient, a threshold number of requests to resend the first and second message; and
    selecting, in response to receiving the threshold number of requests, a third message channel to replace the first message channel.

7. The method of claim 1, wherein the first signal has a first voltage that corresponds to the binary value, and the second signal has a second voltage that corresponds to the inverse of the binary value.

8. A method comprising:
    receiving, over a first message channel, a first signal with a first value;
    receiving, over a second message channel, a second signal with a second value;
    subtracting the first value from the second value, resulting in a third value;
    determining that the third value is greater than zero; and
    identifying, based on the determining, a fourth value of a bit of a data message corresponding to the first signal.

9. The method of claim 8, further comprising calculating an interference variance between the first value and the second value.

10. The method of claim 9, further comprising determining that the interference variance is not bound by a variance threshold.

11. The method of claim 10, wherein the method further comprises requesting retransmission of the first signal and the second signal based on the determining that the interference variance is not bound by the variance threshold.

12. The method of claim 10, wherein the method further comprises replacing the first message channel with a third message channel based on the determining that the interference variance is not bound by the variance threshold.

13. The method of claim 8, wherein the fourth value is a binary "1".

14. A computer program product, the computer program product comprising a computer readable storage medium having program instructions embodied therewith, the program instructions executable by a computer to cause the computer to:
identify a first bit in a data message to be transmitted, wherein the first bit has a binary value;
transmit, in response to the identifying and over a first message channel, a first signal corresponding to the binary value; and
transmit, in response to the identifying and over a second message channel, a second signal corresponding to the inverse of the binary value.

15. The computer program product of claim 14, wherein the first message channel comprises a first frequency band, and the second message channel comprises a second frequency band.

16. The computer program product of claim 14, wherein the first signal is transmitted over the first message channel in a first polarity and the second signal is transmitted over the second message channel in a second polarity.

17. The computer program product of claim 14, wherein the instructions further cause the computer to agree, with a message recipient, that the first message channel is a primary message channel and that the second message channel is an inverse message channel.

18. The computer program product of claim 14, wherein the instructions further cause the computer to:
receive, from the message recipient, a request to resend the first and second messages, wherein the request comprises a notification that an interference variance between the first signal and the second signal is not bound by a variance threshold; and
resend the first and second messages in response to receiving the request to resend the first and second messages.

19. The computer program product of claim 18, further comprising:
receiving, from the message recipient, a threshold number of requests to resend the first and second message; and
selecting, in response to receiving the threshold number of requests, a third message channel to replace the first message channel.

20. The computer program product of claim 14, wherein the first signal has a first voltage that corresponds to the binary value, and the second signal has a second voltage that corresponds to the inverse of the binary value.

* * * * *